US008643738B2

(12) United States Patent
Shiratani

(10) Patent No.: US 8,643,738 B2
(45) Date of Patent: Feb. 4, 2014

(54) FACE DETECTION DEVICE, DIGITAL CAMERA, AND COMPUTER READABLE STORAGE MEDIUM WHICH STORES A FACE DETECTION PROGRAM

(75) Inventor: Fumiyuki Shiratani, Sagamihara (JP)

(73) Assignee: Olympus Corporation, Tokyo (JP)

( * ) Notice: Subject to any disclaimer, the term of this patent is extended or adjusted under 35 U.S.C. 154(b) by 161 days.

(21) Appl. No.: 12/647,890

(22) Filed: Dec. 28, 2009

(65) Prior Publication Data

US 2010/0103279 A1 Apr. 29, 2010

Related U.S. Application Data

(63) Continuation of application No. PCT/JP2008/060720, filed on Jun. 5, 2008.

(30) Foreign Application Priority Data

Jun. 29, 2007 (JP) ................ 2007-171730
Jun. 29, 2007 (JP) ................ 2007-171759

(51) Int. Cl.
*H04N 5/228* (2006.01)
*G06K 9/00* (2006.01)
*G06K 9/46* (2006.01)

(52) U.S. Cl.
USPC .............. 348/222.1; 382/118; 382/190

(58) Field of Classification Search
USPC .......... 348/222.1, 231.99; 382/190, 118, 128
See application file for complete search history.

(56) References Cited

U.S. PATENT DOCUMENTS

2007/0195174 A1* 8/2007 Oren ................ 348/222.1

FOREIGN PATENT DOCUMENTS

| JP | 2003-323615 | | 11/2003 | |
| JP | 2006-018707 | * | 1/2006 | ........... G06T 7/00 |
| JP | 2006-301779 | | 11/2006 | |
| JP | 2006-323779 | | 11/2006 | |
| JP | 2006-330800 | * | 12/2006 | ........... G06T 1/00 |
| JP | 2007-128127 | | 5/2007 | |

OTHER PUBLICATIONS

P. Viola and M. Jones. "Rapid Object Detection using a Boosted Cascade of Simple Features," in Proc. of CVPR, vol. 1, pp. 511-518, Dec. 2001.
International Search Report dated Sep. 22, 2008.

* cited by examiner

*Primary Examiner* — James Hannett
*Assistant Examiner* — Akshay Trehan
(74) *Attorney, Agent, or Firm* — Scully, Scott, Murphy & Presser, P.C.

(57) ABSTRACT

A control unit detects a face area from a first image and a second image which differ in shooting conditions by a face detector. If an area of the first image which is in a position corresponding to a face area detected from the second image is not detected as a face area, the control unit extracts the area of the first image as a non-detected area, and based on the non-detected area, executes learning of the face detector so that the non-detected area is detected as a face area.

6 Claims, 14 Drawing Sheets

FACE DETECTION DEVICE, DIGITAL CAMERA, AND COMPUTER READABLE STORAGE MEDIUM WHICH STORES A FACE DETECTION PROGRAM

CROSS REFERENCE TO RELATED APPLICATIONS

This application is a continuation of International Patent Application No. PCT/JP2008/060720, filed on Jun. 5, 2008, which claims the benefit of Japanese Patent Applications No. JP 2007-171730 and No. JP 2007-171759, which were filed on Jun. 29, 2007, which are incorporated by reference as if fully set forth.

FIELD OF THE INVENTION

The present invention relates to an art of detecting a face from an image.

BACKGROUND OF THE INVENTION

In recent years, automation of face detection processes has progressed and digital cameras having a face detector has been increasing. By having a face detector in a digital camera, it is possible to perform automatic focus control and automatic exposure control which automatically optimize the focus and the exposure value to the face of a person of a photographic subject, and therefore, the face of a person can be shot finely.

Known face detectors include a face detector which is proposed by P. Viola et al. and which provides cascade connection of a plurality of discriminators, (P. Viola and M. Jones. "Rapid Object Detection using a Boosted Cascade of Simple Features," in Proc. of CVPR, vol. 1, ppp. 511-518, December, 2001), and face detectors using a neural network disclosed in JP2006-301779A.

Products, such as a digital camera, have a face detector which already underwent a learning process. JP2003-323615A makes the user input characteristic feature of people frequently shot as photographic subjects to increase accuracy in detecting the face.

SUMMARY OF THE INVENTION

According to an aspect of the present invention, a face detection device comprises a face detector which detects face areas from first and second images that are acquired by shooting a photographic subject with different shooting conditions, and a control unit which, if an area of the first image which is in a position corresponding to a face area detected in the second image is not detected as a face area, extracts the area of the first image as a non-detected area and executes learning of the face detector based on the non-detected area so that the non-detected area is detected as a face area.

According to another aspect of the present invention, a computer readable storage medium which stores a face detection program, comprises a step which detects face areas from first and second images by face detection processes, the first and second images being acquired by shooting a photographic subject with different shooting conditions, a step which, if an area of the first image which is in a position corresponding to a face area detected from the second image is not detected as a face area, extracts the area of the first image as a non-detected area; and a step which executes learning of the face detection process based on the non-detected area so that the non-detected area is detected as a face area.

According to yet another aspect of the present invention, a face detection device, comprises a first face detector which detects a face area from an image, a second face detector which detects a face area from an image which is same or substantially same as the image used by the first face detector and has different detection accuracy from the first face detector; and a control unit which extracts an area which is detected as a face area in the second face detector but not detected as a face area in the first face detector, and executes learning of the first face detector based on the non-detected area so that the non-detected area is detected as a face area.

According to yet another aspect of the present invention, a computer readable storage medium which stores a face detection program, the face detection program comprises a step which detects a face area from an image by a first face detection process, a step which detects a face area from an image which is same or substantially same as the image used by the first face detection process by a second face detection process which has different detection accuracy from the first face detection process, a step which extracts an area which is detected as a face area in the second face detection process but is not detected as a face area in the first face detection process as a non-detected area; and a step which executes learning of the first face detection process based on the non-detected area so that the non-detected area is detected as a face area.

Embodiments and advantages of this invention will be described in detail below with reference to the attached figures.

DETAILED DESCRIPTION OF THE PREFERRED EMBODIMENT

Hereafter, embodiments of the present invention will be described with reference to accompanying drawings.

First Embodiment

Figure 1:
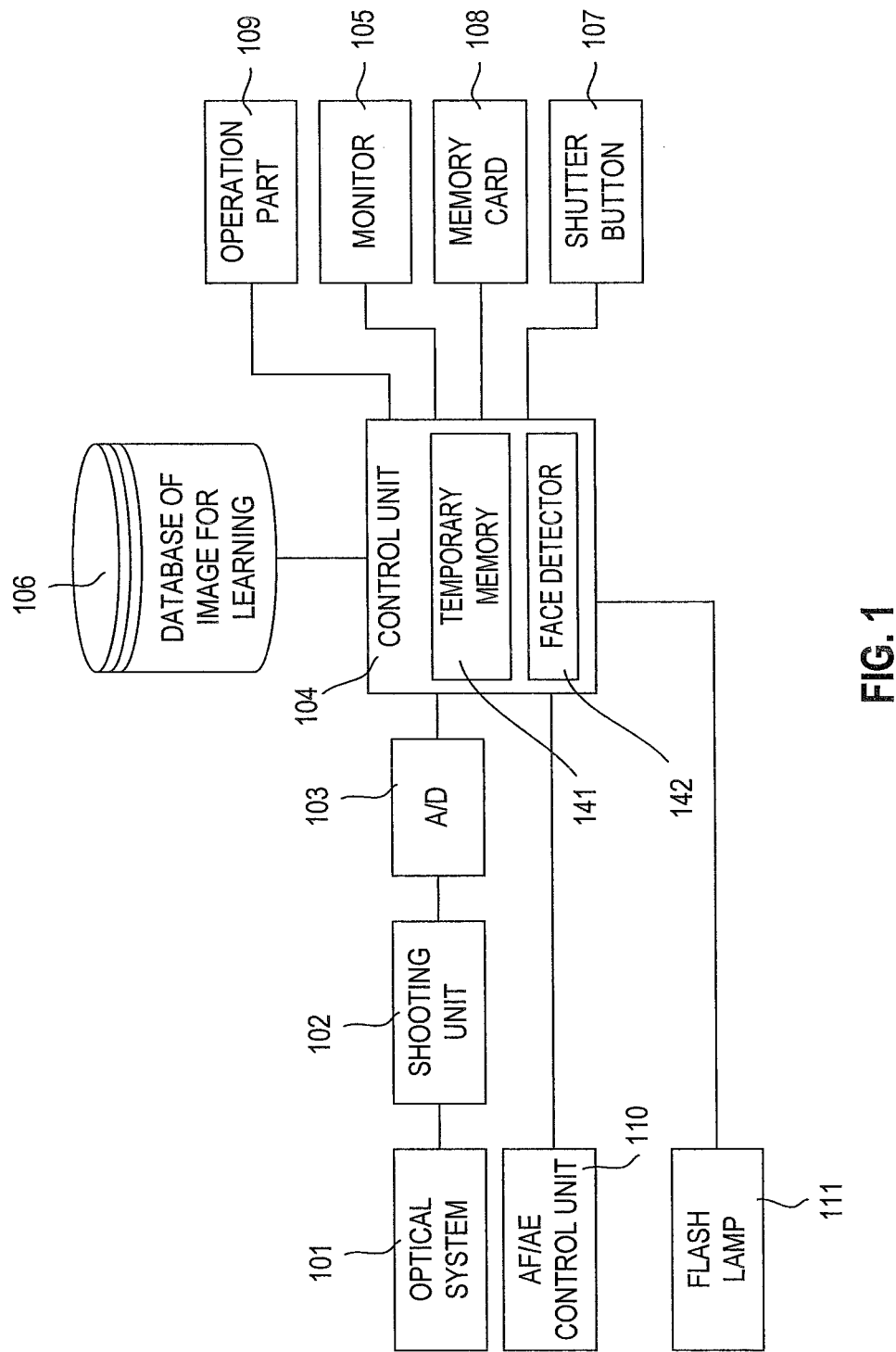
FIG. 1 depicts a schematic structure of a digital camera having a face detection device according to the first embodiment.

FIG. 1 depicts a schematic structure of a digital camera including a face detection device according to the first embodiment.

An optical system 101 includes lenses and an aperture, and a shooting unit 102 includes an electric charge imaging device, such as CCD and CMOS. An image shot with the shooting unit 102 through the optical system 101 (henceforth a "through image") is converted in real time in an A/D converter 103 into a digital signal, and is sent to a control unit 104.

The control unit 104 includes a microprocessor, a temporary memory 141 and a face detector 142. Moreover, the control unit 104 successively records images shot with the shooting unit 102 in the temporary memory 141 as through images (first images), and displays the through images onto a liquid crystal display monitor 105 which is provided at a back surface of the camera. An operation part 109 which includes buttons, dials, etc., is provided in an upper surface and the back surface of the camera, and a user is capable of performing various operations while looking at menu screens, thumbnail images of the shot images, etc., which are displayed on the monitor 105.

In a database 106 of the image for learning connected to the control unit 104, a plurality of images are stored in a situation where the images are associated with teacher signals which indicate that the image is either a face image or a non-face image, and the database 106 is used upon the learning of the face detector 142. The learning method of the face detector 142 will be described later.

The control unit 104 applies the face detector 142 to the through image, and detects face areas from the through image. Based on the position (center position) and the size of the detected face area, the control unit 104 sends a signal to the automatic focus (AF) and automatic exposure (AE) control unit 110, and adjusts the positions of the lenses and the opening of the aperture so that the focus and the exposure value become optimal for the detected face area.

If the user pushes a shutter button 107, the control unit 104 performs a backlight determination based on the through image, and if it is determined that it is backlit, the control unit 104 emits a flash lamp 111. Then, the control unit 104 records the image shot with the shooting unit 102 into a memory card 108 as a shooting image (second image).

If the flash is emitted, the control unit 104 applies the face detector 142 again to the shooting image, and detects the face area from the shooting image. Thereafter, the control unit 104 compares the face detection result from the through image and the face detection result from the shooting image, and if the area of the through image which is in a position corresponding to the face area detected from the shooting image is not detected as a face area, the control unit 104 extracts the area of the through image as a non-detected area, associates the image of the extracted non-detected area with the value of the teacher signal, "1", which indicates that the image is a face image, and adds the image into the database 106.

The control unit 104 performs the learning of the face detector 142 so that the image of the added non-detected area is to be detected as a face area when the number of the images added to the database 106 reaches a predetermined number.

The face detector 142 will be described further. The face detector 142 is a face detector which uses the method which Viola et al. propose, and has a structure shown in FIG. 2 having a cascade connection of a plurality of discriminators $H_k$ (k=1–S) created by the AdaBoost algorithm.

In order to determine whether an area including an image is a face area or not, first, it determines whether the area is a face area or not at a first stage discriminator $H_1$. If it is determined that the area is not a face area, the process ends, and if it is determined that the area is a face area, the process proceeds to a second stage discriminator $H_2$. Then, it determines whether the area is a face area or not at the second stage and the subsequent discriminators $H_k$ also, and if it is determined that the area is not a face area, the process ends, and the process proceeds to the next stage only if it is determined that the area is a face area.

Therefore, the face detector 142 determines that the area is a face area only if the determination that the area is a face area continues to a last stage discriminator $H_s$, and therefore, it is possible to obtain high detection accuracy. On the other hand, the process immediately ends if it is determined that it is not a face area in an intermediate stage, and therefore, it is possible to obtain high processing speed.

Figure 3:
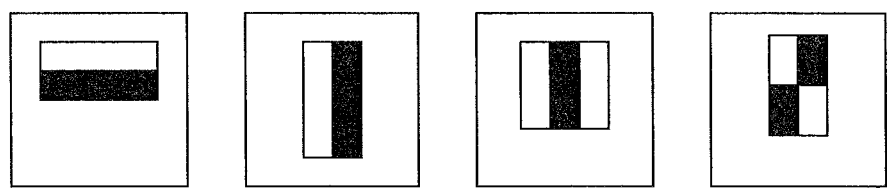
FIG. 3 depicts examples of a rectangular filter which constitutes a weak discriminator.

Each discriminator $H_k$ is configured by linear combining a plurality of weak discriminators. The weak discriminator is a set of a rectangular filter which includes black rectangle(s) and white rectangle(s) as shown in FIG. 3, and a threshold θ. The weak discriminator superposes the rectangular filter onto the area which is to be the target of the face detection, determines whether the difference between the sum of the luminance value in the area corresponding to the black rectangle and the sum of the luminance value in the area corresponding to the white rectangle is larger than the threshold θ or not, and outputs "1" which indicates that the area is a face if the difference is larger than the threshold θ, and outputs "0" which indicates that the area is a non-face if the difference is smaller.

If the area which is the target of the face detection is inputted into the discriminator $H_k$, the discriminator $H_k$ computes the total sum of the values obtained by multiplying the output of each weak discriminator by the reliability value of the weak discriminator α, and computes the value obtained by subtracting a predetermined threshold $Th_T$ from the total sum as a conviction value Conv(k). The conviction value Conv(k) is a value showing the accuracy of a face being included in the area. Then, if the conviction value Conv(k) is a positive value, the discriminator $H_k$ determines that the area is a face area and outputs "+1", and if the conviction value Conv(k) is a negative value, the discriminator $H_k$ determines that the area is a non-face area and outputs the value, "−1".

Figure 4:
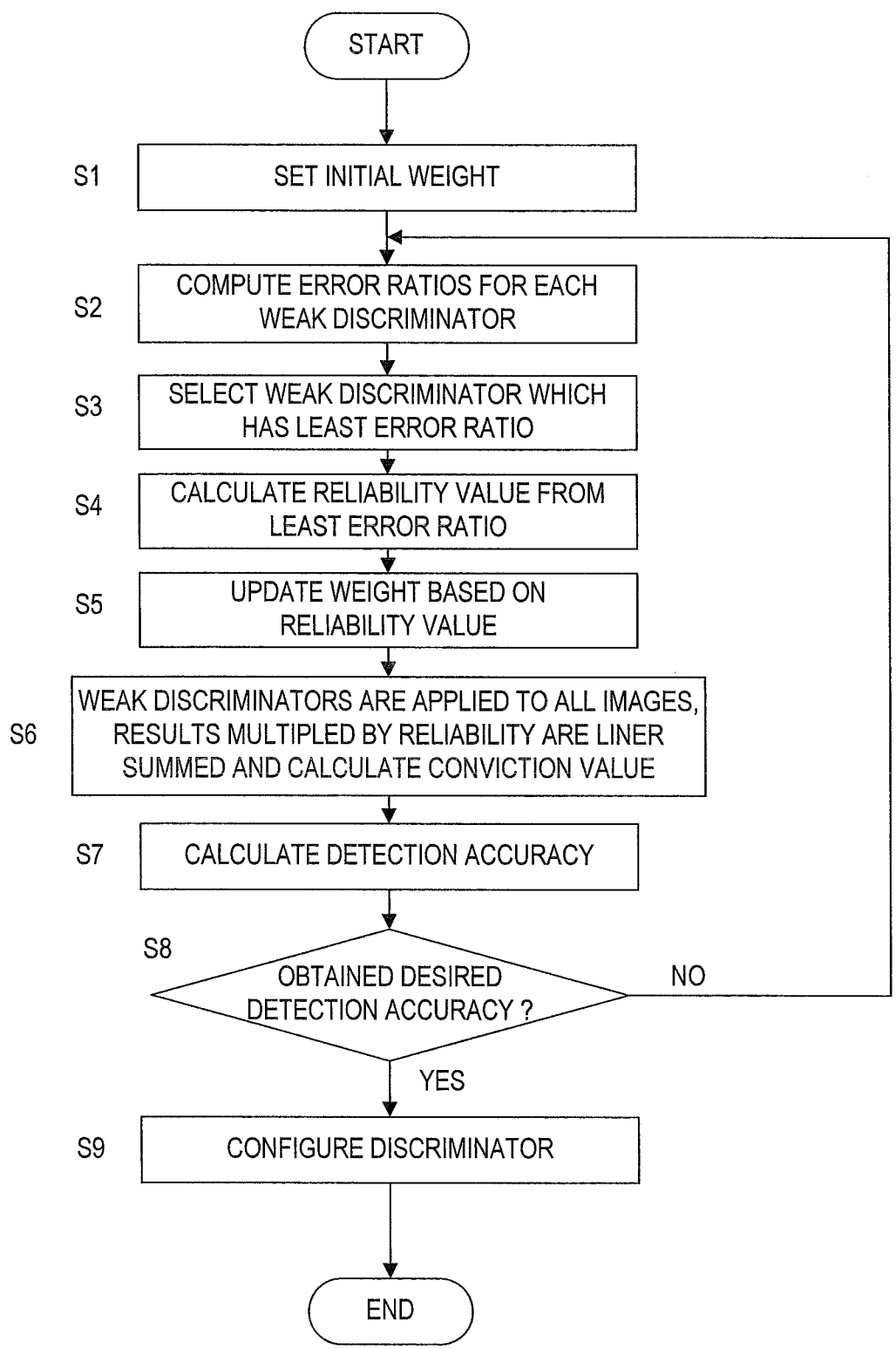
FIG. 4 depicts a flow chart showing the details of a process to create a discriminator.

FIG. 4 depicts a flow chart showing the details of a process to create a discriminator. The selection of the weak discriminator which configures the discriminator $H_k$ is done by the AdaBoost algorithm, and it is repeated until the discriminator $H_k$ can determine a face and a non-face in a desired accuracy to the image which is stored in the database 106. A subscript t is an updated count number of the discriminator $H_k$ (number of the times the weak discriminator is added to the discriminator $H_k$), and the initial value is 1.

Accordingly, first, at Step S1, the weight of each image stored in the database 106 is set to the initial value $W_1(i)$ by the following expression (1). In the expression (1), i is a serial number assigned to each image, and N is a total number of the images stored in the database 106.

$$W_1(i) = \frac{1}{N} \ (i = 1, \ldots, N) \tag{1}$$

At Step S2, various weak discriminators are applied to all of the images, and the error rate $\epsilon_t$ is computed by the following expression (2).

$$\varepsilon_t \sum_{\text{mistakenly determined } i} W_t(i) \tag{2}$$

At Step S3, the weak discriminator which has the least error rate $\epsilon_t$ is selected as a weak discriminator $h_t$ which configures the discriminator $H_k$. Then, the selected weak discriminator $h_t$ is added to the discriminator $H_k$ to update the discriminator $H_k$.

At Step S4, based on the error rate $\epsilon_t$ of the selected weak discriminator $h_t$, the reliability value $\alpha_t$ of the selected weak discriminator $h_t$ is computed by the following expression (3).

$$\alpha_t = \frac{1}{2} \ln \frac{1 - \varepsilon_t}{\varepsilon_t} \tag{3}$$

At Step S5, based on the reliability value $\alpha_t$ of the selected weak discriminator $h_t$, the weight $W_t(i)$ of the image that the weak discriminator $h_t$ made an error in the determination is increased by the following expression (4), and alternatively, the weight $W_t(i)$ of the image that the determination is correct is decreased by the following expression (5). Furthermore, the weight $W_t(i)$ after the update is divided with the total sum of the weight $W_t(i)$ to normalize the weight $W_t(i)$.

$$W_{t+1}(i) = W_t(i) \exp(\alpha_t) \tag{4}$$

$$W_{t+1}(i) = W_t(i) \exp(-\alpha_t) \tag{5}$$

At Step S6, the weak discriminator $h_t$ is applied to all of the images, obtains the total of the value which multiplied the result by the corresponding reliability value $\alpha_t$, and calculates the value which subtracted the threshold $Th_T$ from the total sum as the conviction value Conv(k) by the following expression (6). In the expression (6), x is the luminance information of the image. The conviction value Conv(k) may be applied a sigmoid function or may be divided by a maximum value so that it may be normalized in between 0 and 1.

$$\text{Conv}(k) = \sum_{t=1}^{T} \alpha_t h_t(x) - Th_T \tag{6}$$

At Step S7, it determines whether the area which is the target of the face detection is a face area or not for all of the images according to the positive and negative of the sign of the conviction value Conv(k). Then, to compute a detection accuracy, the number of the images which the determination of the face area and the non-face area is done correctly is divided by the total number N of the images stored in the database 106.

At Step S8, it determines whether a desired detection accuracy is obtained or not. If the desired detection accuracy is obtained, the process proceeds to Step S9.

At Step S9, the discriminator $H_k$ is configured by the following expression (7).

$$H_k = \text{sgn}(\text{Conv}(k)) \tag{7}$$

The discriminator $H_k$ computes the conviction value Conv(k) by the Expression (6) after the luminance information of an area in the image is inputted, and if the sign of the conviction value Conv(k) is positive, it determines that the area is a face area and outputs "+1", and if it is determined that the sign is negative, it determines that the area is a non-face area and outputs "−1".

The information in the preceding stages is not usually carried over in a cascade process. However, in the discriminator $H_k$, the total sum, Convsum, of the first to the k-th stage conviction values Conv(k) may be computed by the following expression (8) to determine the face area and the non-face area with the sign of Convsum. Experience shows that obtaining the total sum of the conviction values Conv(k) and reflecting also the conviction values calculated in the previous stages as in the above provide higher detection accuracy.

$$\text{Convsum} = \sum_{k=1}^{k} \text{Conv}(k) \tag{8}$$

Alternatively, if it is determined that the desired detection accuracy is not obtained at Step S8, the update count number t is incremented, and the process returns to Step S2 to select a new discriminator and to add the selected weak discriminator to the discriminator $H_k$. The addition of a weak discriminator is repeatedly done until the desired detection accuracy is obtained.

Now, the details of the process at the time of the shooting with the digital camera will be described.

Figure 5:
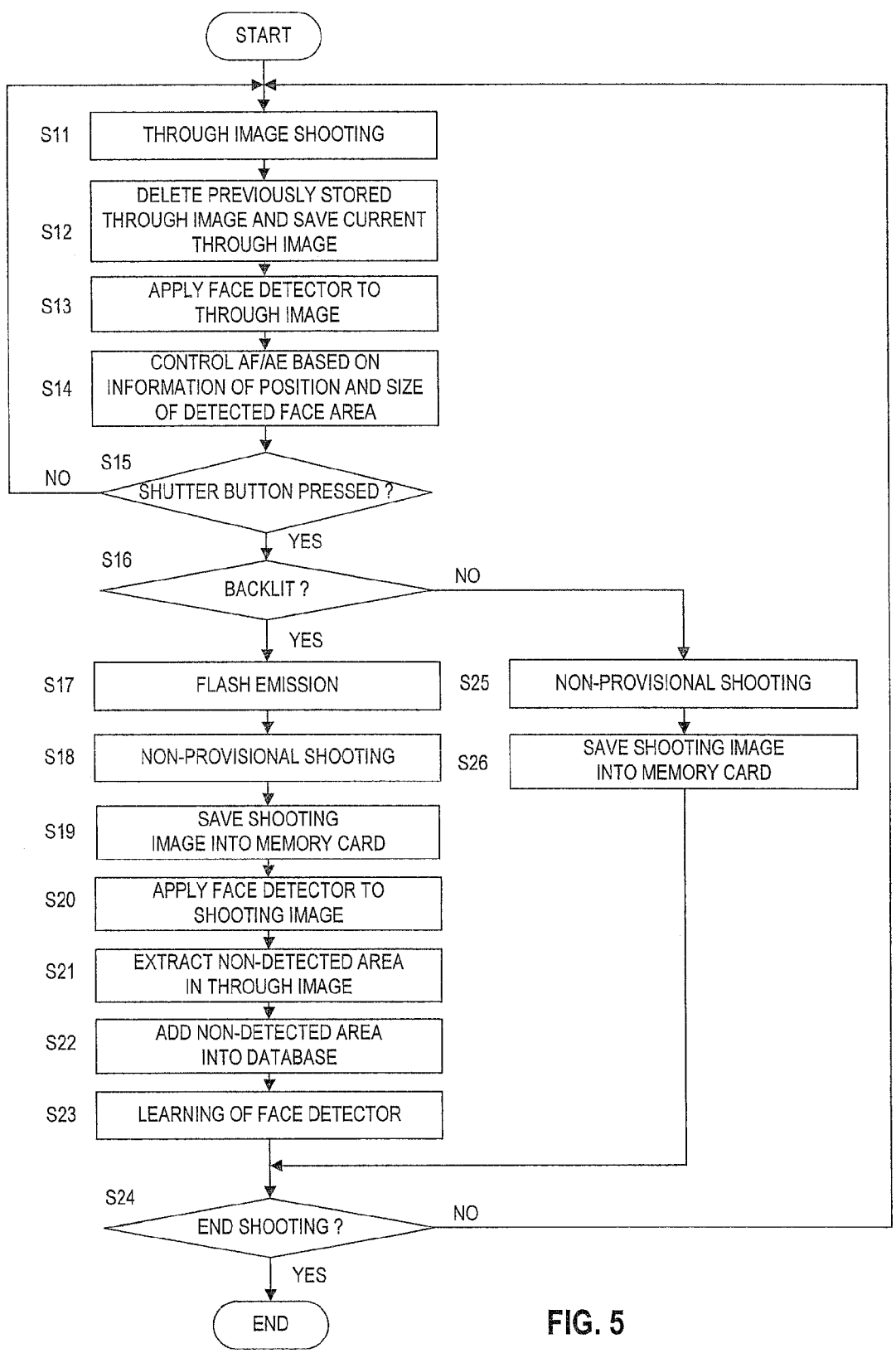
FIG. 5 depicts a flow chart showing the details of a process in a control unit at the time of the shooting.

FIG. 5 depicts a flow chart showing the process in the control unit 104. This process is executed repeatedly at the control unit 104 when the digital camera is in a shooting mode.

In the process, at Step S11, the through image is shot at the shooting unit 102, and the shot through image is displayed shot on the monitor 105.

At Step S12, the through image stored in the temporary memory 141 is deleted, and a newly shot through image is saved in the temporary memory 141.

At Step S13, the face detector 142 is applied to the through image saved in the temporary memory 141, and a face area is detected from the through image. If a face area is detected, a rectangular frame surrounding the area is displayed on the monitor 105 to show the user that the face area is detected.

At Step S14, based on the information of the position and the size of the detected face area, the positions of the lenses and the opening of the aperture are adjusted using the AF/AE control unit 110, and the focus and the exposure value are optimized for the detected face area.

At Step S15, it determines whether the shutter button 107 is pressed or not. If the shutter button 107 is pressed, the process proceeds to Step S16. If the shutter button 107 is not pressed, the process returns to Step S11 to repeat the shooting of the through image and the detection of the face area from the through image.

At Step S16, a backlight determination is done. For example, the determination of whether it is backlit or not is done based on the difference in the luminance in the central region and the periphery region in the through image, and it determines it is backlit if the periphery region is darker than the central region. If it is determined that it is backlit, the process proceeds to Step S17, and if it is determined that it is not backlit, the process proceeds to Step S25.

At Step S17, the flash lamp 111 is emitted.

At Step S18, the non-provisional shooting is executed. At this time, the focus and the exposure value are already optimized for the face area which is detected by the face detector 142, and therefore, it is possible to shoot the face of a person who is a photographic subject finely in the non-provisional shooting.

At Step S19, the shot image is saved in the memory card 108 as the shooting image.

At Step S20, the face detector 142 is applied to the shooting image shot with a flash saved in the memory card 108 to detect the face area from the shooting image.

Figure 6:
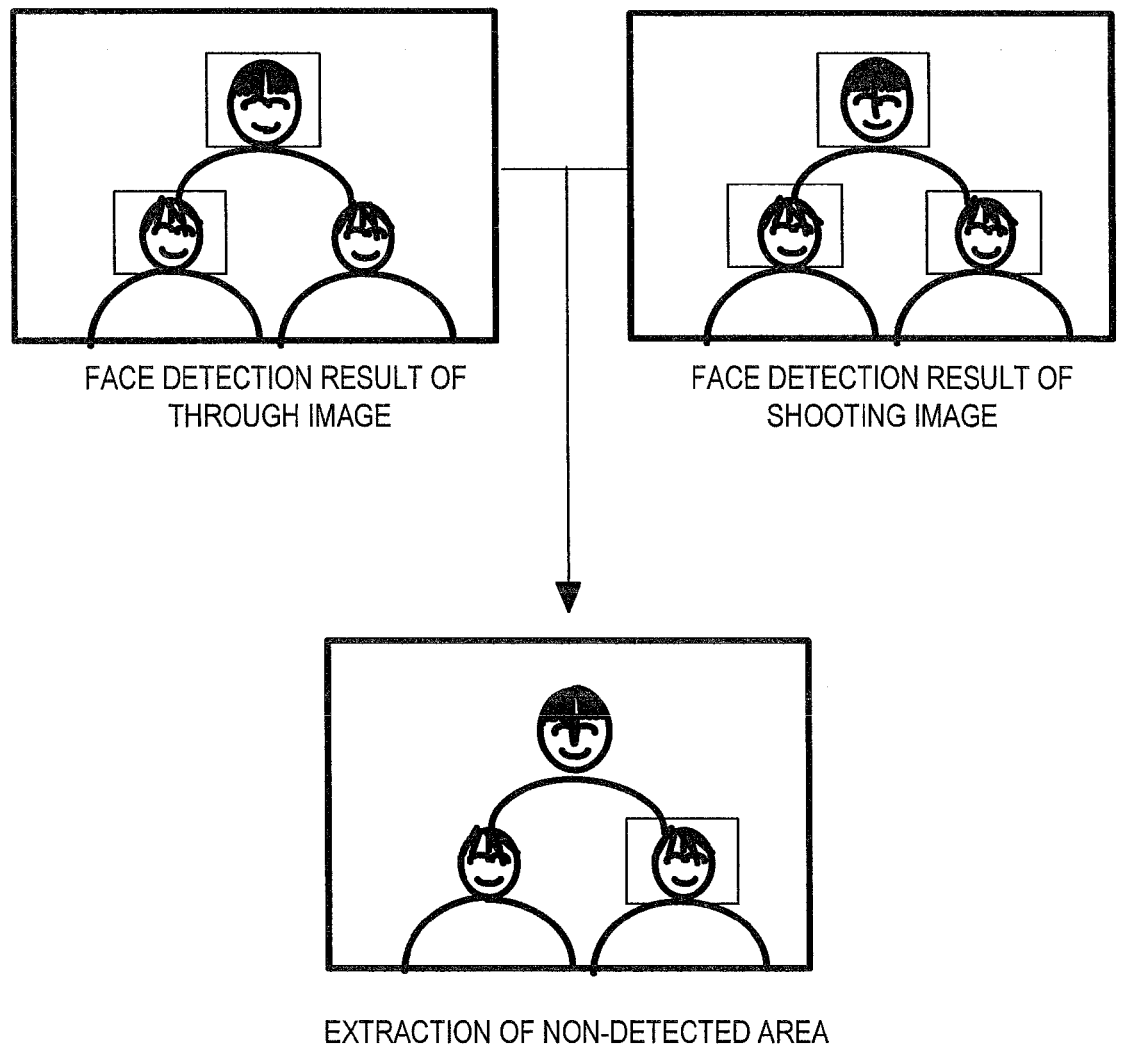
FIG. 6 depicts an example of face detection results with a face detector.

At Step S21, the face detection result from the through image and the face detection result from the shooting image are compared, and if an area in the through image in a position corresponding to the face area detected from the shooting image is not detected as a face area, the area in the through image is extracted as a non-detected area. FIG. 6 shows the situation at that time. In this example, the rectangular area surrounding the face of the person at the lower right of a screen among the faces of three people used as a photographic subject is extracted as a non-detected area.

At Step S22, the image of the extracted non-detected area is associated with the value of the teacher signal, "1", which indicates that the image is a face image, and is stored in the database 106.

It is noted that if the image of a non-detected area is unconditionally stored in the database 106 as a face image, a non-face image will be stored in the database 106 as a face image if it is mistakenly determined that the area in the shooting image which does not contain a face is a face area, and therefore, it adversely affects to the subsequent learning result of the face detector 142.

Therefore, at Step S22, it may determine whether the conviction value at the time when the area of the shooting image corresponding to the extracted non-detected area is determined by the face detector 142 to be a face area is greater than or equal to a predetermined value or not, to store the image of the extracted non-detected area in the database 106 if the conviction value is greater than or equal to the predetermined value.

Alternatively, the image of the extracted non-detected area may be displayed on the monitor 105, and after the user checks that a face is included in the image, the user may operate the operation part 109 to add the extracted non-detected area into the database 106 as a face image. At this time, if a face is not included in the non-detected area, the image may be associated with the value of the teacher signal, "0", which indicates that the image is a non-face image, and may be added into the database 106 as a non-face image.

At Step S23, it determines whether the number of the added images has reached a predetermined number or not, and if it has reached the predetermined number, the learning of the face detector 142 is executed. The reason why the learning is executed at the time when the number of the added images has reached a predetermined number is that it took into consideration the computation load caused by the learning.

The learning of the face detector 142 is executed by remaking the discriminator $H_k$ which configures the face detector 142 by executing again the process shown in FIG. 4 using the database 106 to which the image of the non-detected area is added. The learning is executed so that a non-detected area is detected as a face area, and therefore, in the remade face detector 142, the image of the non-detected area which has not been detected as a face area is detected as a face area.

At Step S24, it determines whether to end the shooting, and if it is determined to end the shooting, the process ends, and if not, the process returns to Step S11.

On the other hand, in Step S25 after determining it is not backlit at Step S16, the non-provisional shooting is executed without emitting the flash lamp 111, and the shooting image is saved into the memory card 108 at Step S26. At this time, there is no difference in the shooting conditions of the through image and the shooting image, and therefore, the learning of the face detector 142 is not executed.

According to the above arrangement, face areas are detected from both the through image and the shooting image, and if an area is detected as a face area in the shooting image but a corresponding area in the through image is not detected as a face area, the area in the through image is extracted as a non-detected area, and the learning of the face detector 142 is executed so that the area is detected as a face area.

Although the face detection from the through image at the time of a backlit situation often fails due to an insufficient exposure, the face detection from the shooting image using flash tends to be successful. For this reason, by comparing the results of the face detections from both images, the area which is not detected from the through image can be extracted as a non-detected area, and by executing the learning of the face detector 142 so that the non-detected area is detected as a face area, the accuracy of the face detection from the through image can be improved.

The learning is executed based on a face of a person who is actually shot, and therefore, the accuracy in the face detection of the face of a person frequently being a photographic subject improves as the learning advances. Moreover, the learning of the face detector 142 is executed while the user is oblivious to the learning, and therefore, it imposes few burdens to the user.

In the above embodiment, the flash lamp 111 emits light at the time of the backlight determination. However, the shooting image may be shot with a flash by compulsorily emitting the flash lamp 111, to compare the face detection result from the shooting image and the face detection result from the through image. Alternatively, non-provisional shootings may be done for both the cases with or without a flash, to compare between the face detection results from both images.

Moreover, the through image shot without a flash and the shooting image shot with a flash are used as two images which differ in shooting conditions. However, such two images which differ in shooting conditions are not limited to those, and may be images which differ in shooting conditions, such as exposure value and resolution, in some way.

For example, if the digital camera does auto-bracket shooting which shoots a plurality of images having different exposure values, the learning of the face detector 142 is executed based on the face detection result of the plurality of images having different exposure values.

Figure 7:
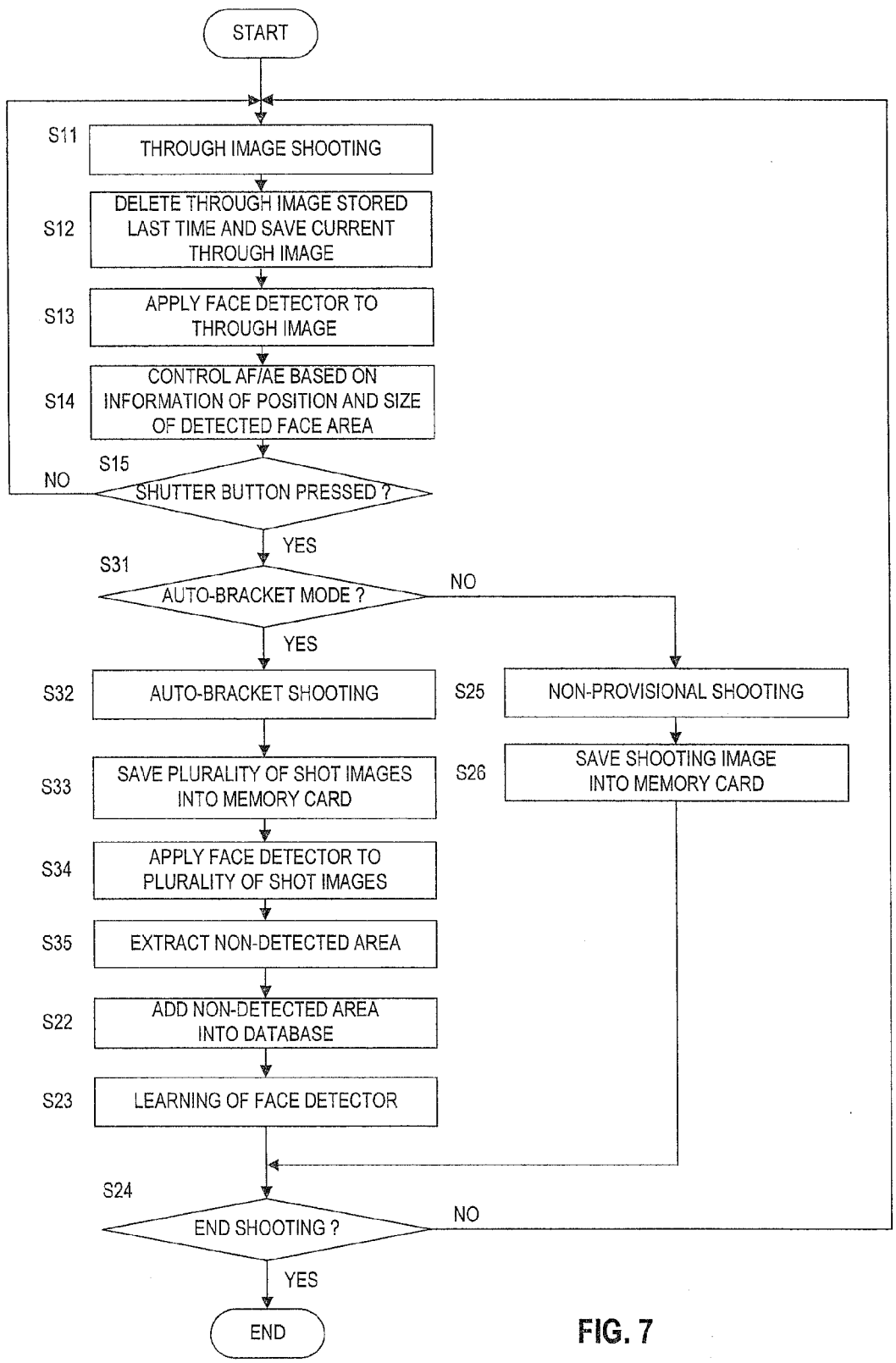
FIG. 7 depicts a flow chart showing details of other process of the control unit at the time of shooting.

FIG. 7 depicts a flow chart in the case where the learning of the face detector 142 is executed from a plurality of images obtained by the auto-bracket shooting, and is executed at the control unit 104 instead of the flow chart shown in FIG. 5.

The flow chart in FIG. 7 differs from the flow chart shown in FIG. 5 in the process after the shutter button 107 is pressed. Same process is assigned a same numeral to omit the description, and only the different portion will be described. At Step S31 after the shutter button 107 is pressed, it determines whether the shooting is a shooting in an auto-bracket mode or not, and if it is in the auto-bracket mode, the process proceeds to Step S32.

At Step S32, the AF/AE control unit 110 is directed to change the exposure value to lower side and the higher side using the exposure value obtained from the automatic exposure, and in the shooting unit 102, a plurality of images having different exposure values are shot.

At Step S34, the face detector 142 is applied to each of the plurality of images having different exposure values, and a face area is detected from each of the plurality of images.

At Step S35, the face detection results from the plurality of images are compared, and if an area of a particular image which is in a position corresponding to the face area detected from another image is not detected as a face area, the area of the particular image is extracted as a non-detected area.

The process hereafter is the same as the flow chart shown in FIG. 5. At Step S22, the image of the extracted non-detected area is stored in the database 106. At Step S23, if the number of the added images has reached a predetermined number, the learning of the face detector 142 is executed.

It is noted that the object which to expect improvement in the detection accuracy with the learning is not limited to a face of a specific person. For example, in a case where photographs of pets, such as a dog and a cat, are often shot, if the face detector 142 can detect a face of a pet in the shooting with a flash, the image of a face of the shot pet is added to the database 106 as a face image and the learning of the face detector 142 is executed, and therefore, it is possible to improve the detection accuracy of the face of the pet with the face detector 142.

Although the learning herein is executed by remaking the discriminator $H_k$ which configures the face detector 142, the method of learning is not limited to this method. For example, the value of the threshold $\theta$ and the reliability value $\alpha$ of a weak discriminator which performed mistaken detection may be changed so that the area mistakenly determined to be a non-face area is correctly detected as a face area. According to this method, computation load can be lowered compared to the learning method which remakes the face detector 142.

Alternatively, in the case where the discriminator $H_k$ is remade, it is possible to make modifications, such as imposing a different restriction from the weight of other image for the weight of the image in the area mistakenly determined to be a non-face area in spite of including a face. For example, with respect to the weight of the face image mistakenly determined to be a non-face area, even if it is determined correctly in the course of the learning, a restriction may be imposed so that the weight does not become smaller than a certain value, or a restriction may be imposed so that the weight always becomes larger than a certain value upon the update. Thereby, it is expected that the learning progresses so as to make correct determination to the image.

Moreover, since the load of the control unit 104 is heavy in the learning process, the learning may be executed in a situation such as during the user charging a battery of the digital camera. By executing the learning at the time when the user does not shoot, such as during the user charging the battery, it is possible to prevent the computation load from adversely affecting the shooting operations. It is noted that the computation for the learning may be done with a processor provided in a charger device of the digital camera or a cradle, instead of the control unit 104.

Moreover, instead of the method which Viola et al. propose, the face detector may be configured with other methods. For example, the neural network may be configured with a face detector. In this case, the learning may be done by providing the image mistakenly determined to be a non-face image in spite of including a face to the face detector and by updating weight parameters of intermediate layers, etc., such that the determination value, "+1", which indicates a face is correctly outputted.

Figure 8:
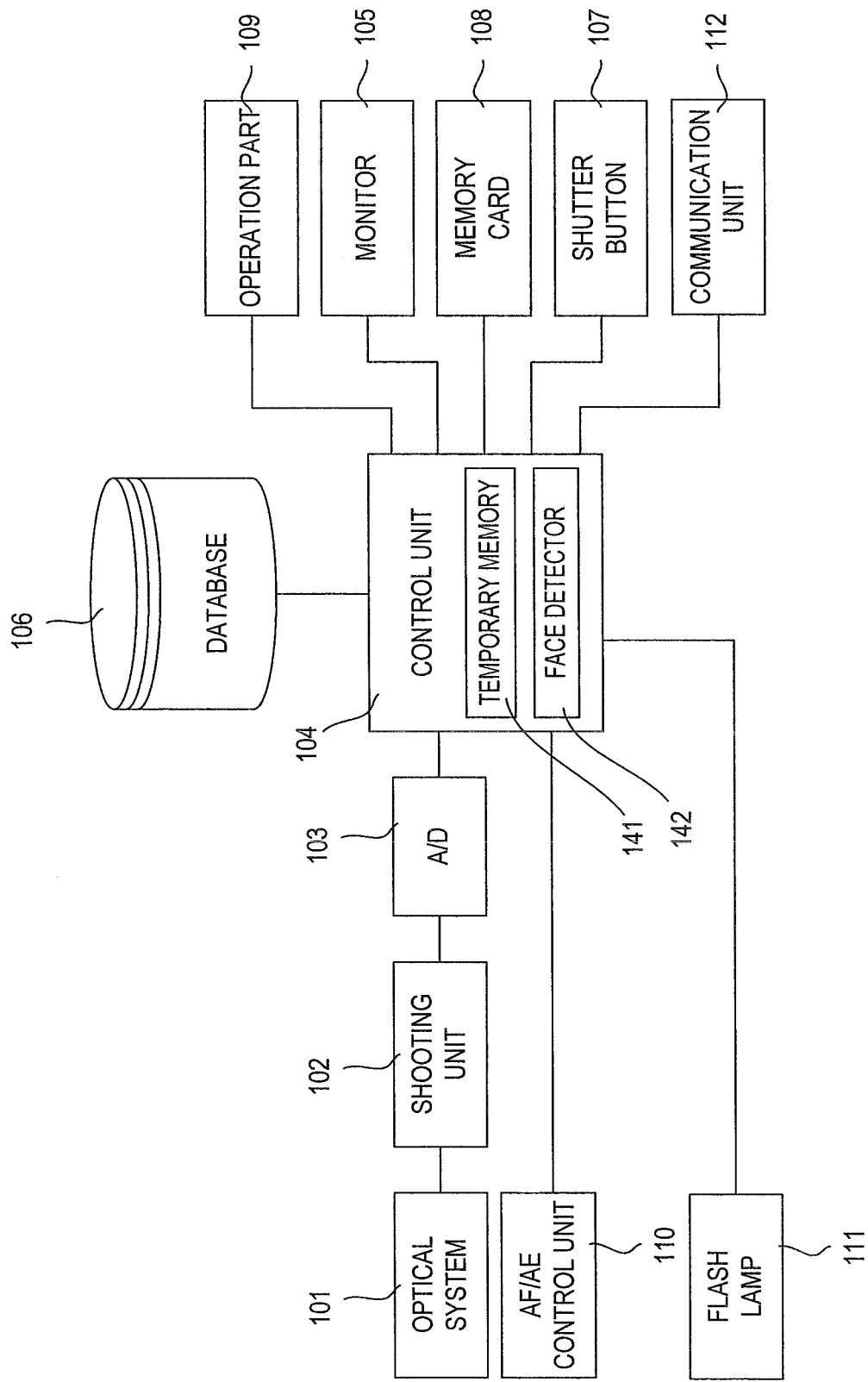
FIG. 8 depicts an example of a partial modification of the first embodiment.

Moreover, as shown in FIG. 8, the face detector 142 may be updated based on newest learning results by providing with a communication unit 112 which includes a communication device for connecting with a network external to the digital camera, such as a wireless LAN device and a Bluetooth device, retrieving the newest learning results from an external server through a network, such as the Internet.

If the detection accuracy of the face detector 142 improves, the possibility that the face area which was not able to be detected from the through image can be detected as a face area from the shooting image shot with a flash becomes higher and the learning of the face detector 142 progresses further. Consequently, the accuracy of the detection by the face detector 142 of the face of a person who frequently becomes a photographic subject can be further improved.

Furthermore, the non-detected area of the face detector 142 may be configured to transmit to a service center through a network so that an operator in a service center determines the face area and the non-face area. The determined result is returned to the control unit 104 of the digital camera as a teacher signal through a network, and is added to the database 106 in a condition where the result is associated with the image of the non-detected area.

In accordance with this method, it is possible to prevent the image of the area which does not include a face being added into the database 106 as a face image and to prevent disadvantageous affects to the learning of the face detector 142 of the face detector, without increasing the operation burden of the user.

Figure 9:
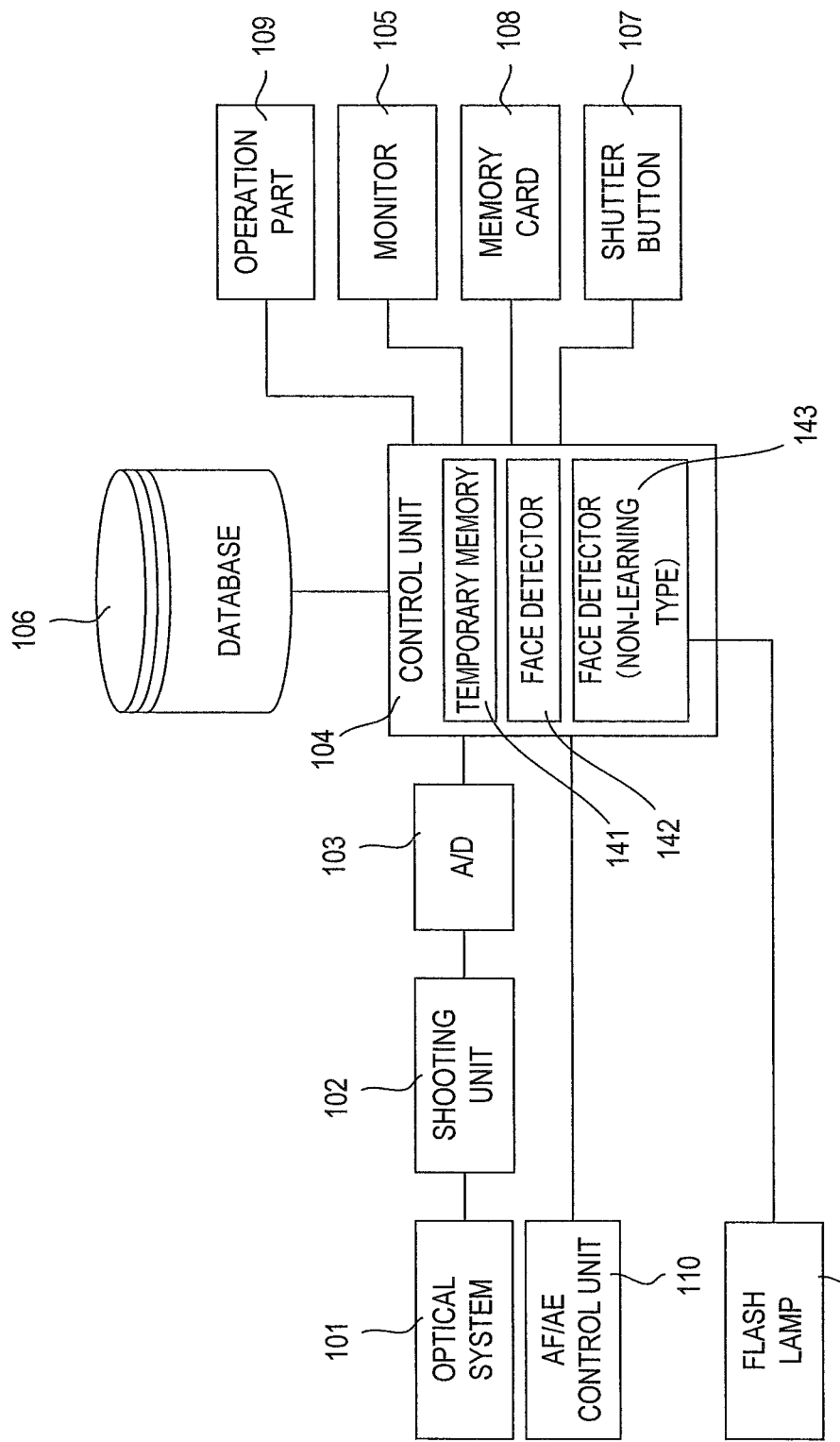
FIG. 9 depicts an example of a partial modification of the first embodiment.

Moreover, the detection accuracy of a face of a person who is not shot usually falls if the learning of the face detector 142 progresses too much, and therefore, the face detection may not be performed correctly depending on shooting scenes. In order to avoid this, as shown in FIG. 9, the two face detectors 142 and 143 are prepared, the learning is executed only to one face detector 142, and the learning is not executed to the another face detector 143. Then, the user is enabled to select either of the face detector 142 underwent the learning or the face detector 143 not underwent the learning according to a shooting scene by operating the operation part 109.

According to this arrangement, the face detection is done from the through image using the face detector 143 not underwent the learning by selecting the face detector 143 not underwent the learning. Therefore, even in a case where a person who is not shot usually is shot, it is possible to obtain detection accuracy better than a predetermined level.

Moreover, the digital camera may have a function which performs the maintenance of the image stored in the database 106. For example, in a case where the image stored in the database 106 is displayed in a thumbnail image to the monitor 105 with the teacher signal and the value of the teacher signal of the image which does not include a face is "1", which indicates a face image, by operating the operation part 109, the value of the teacher signal of the image may be rewritten to "0" (it may also be rewritten to the contrary), the user may be capable of deleting the image from the database 106. Thereby, it is possible to further improve the detection accuracy of the face of a person who is frequently used as a photographic subject.

Second Embodiment

Now, the second embodiment of the present invention will be described.

Figure 10:
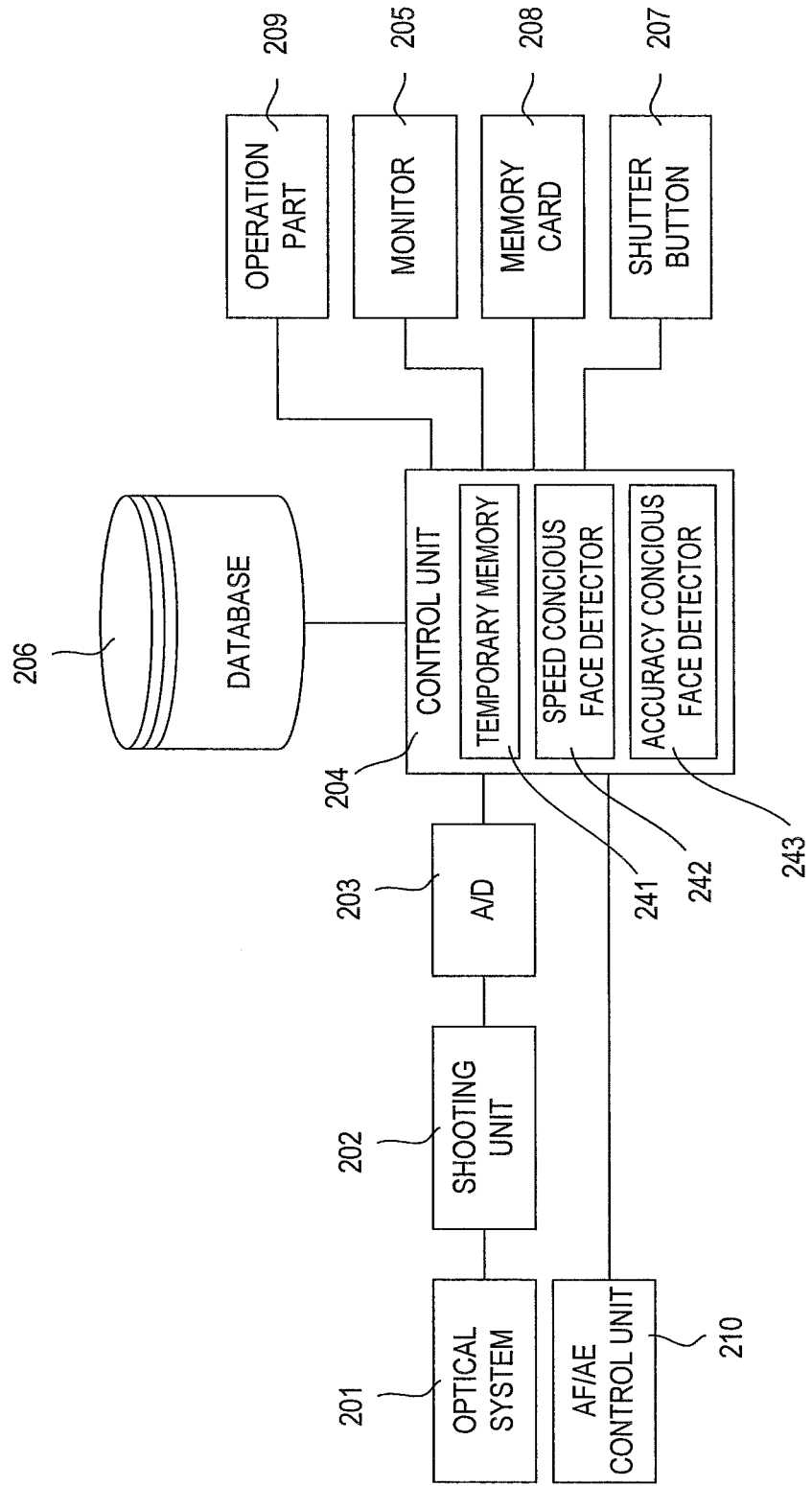
FIG. 10 depicts a schematic structure of a digital camera having a face detection device according to the second embodiment.

FIG. 10 depicts a schematic structure of a digital camera having a face detection device according to the second embodiment.

An optical system 201 includes lenses and an aperture, and a shooting unit 202 includes an electric charge imaging device, such as a CCD and a CMOS. An image shot in the shooting unit 202 through the optical system 201 is converted in real time by an A/D converter 203 to a digital signal, and is sent to the control unit 204.

The control unit 204 includes a microprocessor, a temporary memory 241, a speed conscious face detector (first face detector) 242, and an accuracy conscious face detector (second face detector) 243. Moreover, the control unit 204 successively records the image shot at the shooting unit 202 into the temporary memory 241 as a through image, and displays the through image on the liquid crystal display monitor 205 which is provided in the back surface of the camera. An operation part 209 which consists of a button, a dial, etc. is provided in the upper surface and the back surface of the camera, so that a user can perform various operations while looking at menu screens, thumbnail images of the shot image, etc., which are displayed on the monitor 205.

In the database 206 of the image for learning connected to the control unit 204, a plurality of images are stored in a condition where each of the images are associated with a teacher signal which indicates that the image is a face image or a non-face image. The database 206 is used upon the learning of the speed conscious face detector 242. The learning method of the speed conscious face detector 242 will be described later.

Until a shutter button 207 is pressed, the control unit 204 applies the speed conscious face detector 242 to the through image and detects a face area from the through image. Then, based on the position (center position) and the size of the detected face area, the control unit 204 adjusts the positions of the lenses and the opening of the aperture by sending a signal to the automatic focus (AF) and automatic exposure (AE) control unit 210 so that the focus and the exposure value become the optimal for the detected face area.

The non-provisional shooting is done by the user pushing the shutter button 207. The control unit 204 records the image shot by the non-provisional shooting on a memory card 208 as the shooting image.

The control unit 204 applies the accuracy conscious face detector 243 to the shooting image, and detects a face area from the shooting image. Then, the control unit 204 compares the face detection result of the speed conscious face detector 242 and the face detection result of the accuracy conscious face detector 243, extracts the area which is detected as a face area by the accuracy conscious face detector 243 but not detected as a face area by the speed conscious face detector 242 as a non-detected area, associates the image of the extracted non-detected area with the value of the teacher signal, "1", which indicates that the image is a face image, and adds it to the database 206.

The control unit 204 executes the learning of the speed conscious face detector 242 so that the image of the added non-detected area is detected as a face area at the time when the number of the images added to the database 206 reached a predetermined number.

Figure 2:
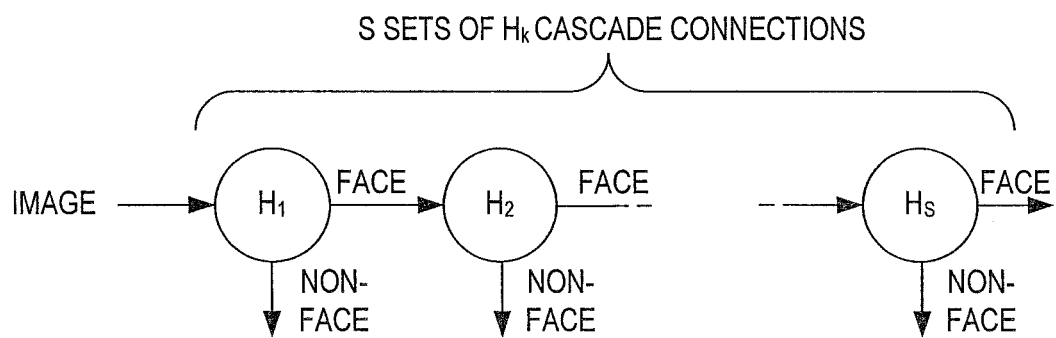
FIG. 2 depicts a diagram for illustrating a face detector.

Both the two face detectors are face detectors using the method which Viola et al. propose, and has a structure having a cascade connection of a plurality of discriminators $H_k$ (k=1–S) created by the AdaBoost algorithm, as shown in FIG. 2.

The speed conscious face detector 242 and the accuracy conscious face detector 243 are configured by the process shown in FIG. 4 as in the face detector 142 according to the first embodiment. For example, the difference between the detectors 242 and 243 can be obtained by changing the threshold $\theta$ of the weak discriminator.

Figure 11:
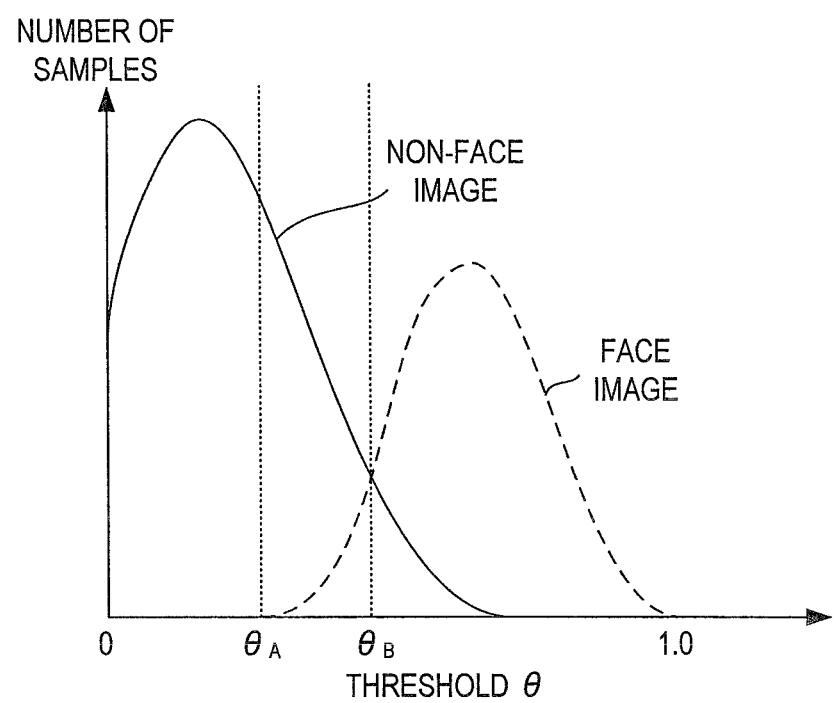
FIG. 11 depicts a diagram showing a relation of the number of the samples to be recognized as face or non-face and the size of the threshold.

For example, if the threshold $\theta$ is set to a relatively low value $\theta_A$ as shown in FIG. 11, a weak discriminator which determines an area including a face substantially correctly as a face area, but often mistakenly determines an area not including a face as a face area is obtained. The discriminators which configure the accuracy conscious face detector 243 are configured by combining many of such weak discriminators to recognize the face area and the non-face area in high accuracy. However, the larger the number of the weak discriminators which configure the discriminator, the slower the process becomes.

On the other hand, if the threshold $\theta$ is set to a relatively high value $\theta_B$, the weak discriminator becomes a weak discriminator having both the rate that an area including a face is correctly determined as a face area and the rate that an area not including a face is determined as a non-face area high to some extent. Therefore, by combining a small number of pieces of such weak discriminators, it is possible to obtain a discriminator having fast processing speed although there are slightly large amount of the non-detected and over-detected ones, and the speed conscious face detector 242 is configured by combining such discriminators.

It is noted that the accuracy conscious face detector 243 may combine different methods, such as using together both the method which combines the known Gabor filter and the graph matching process and the method which Viola et al. propose.

Now, the details of the process at the time of shooting of the digital camera will be described.

Figure 12:
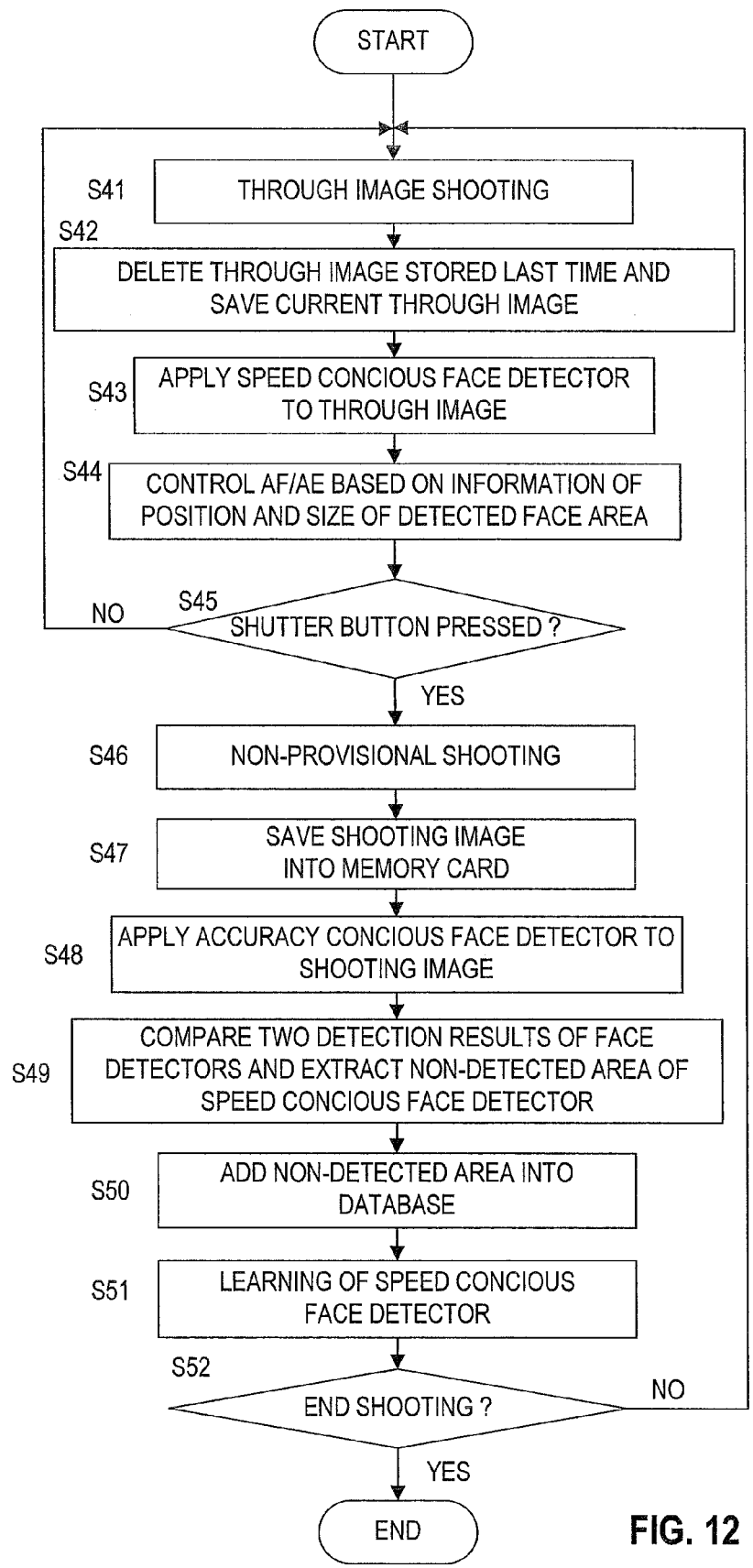
FIG. 12 depicts a flow chart showing the details of a process of the control unit at the time of shooting.

FIG. 12 depicts a flow chart showing the details of a process of the control unit 204 at the time of shooting. This process is repeatedly executed in the control unit 204 when the digital camera is in a shooting mode.

According to this process, at Step S41, a through image is shot at the shooting unit 202 and the shot through image is displayed on the monitor 205.

At Step S42, the through image stored in the temporary memory 241 is deleted, and the newly shot through image is saved into the temporary memory 241.

At Step S43, the speed conscious face detector 242 is applied to the through image saved in the temporary memory 241, and the face area is detected from the through image. If a face area is detected, the rectangular frame surrounding the area is displayed on the monitor 205 to indicate that a face area is detected by the user.

At Step S44, based on the information of the position and the size of the detected face area, the positions of the lenses and the opening of the aperture are adjusted through the AF/AE control unit 210, and the focus and the exposure value are optimized for the detected face area.

At Step S45, it determines whether the shutter button 207 is pressed or not. If the shutter button 207 is pressed, the process proceeds to Step S46. If not, the process returns to Step S41 to repeat the shooting of the through image and the detection of the face area from the through image.

At Step S46, the non-provisional shooting is done. At this time, the focus and the exposure value are already optimized for the face area detected by the speed conscious face detector 242, and therefore, it is possible to shoot a face of a person who is a photographic subject finely in the non-provisional shooting.

At Step S47, the shot image is saved in the memory card 208 as a shooting image. The shooting image is an image substantially the same as the through image shot immediately before.

At Step S48, the accuracy conscious face detector 243 is applied to the shooting image saved in the memory card 208 to detect the face area from the shooting image.

Figure 13:
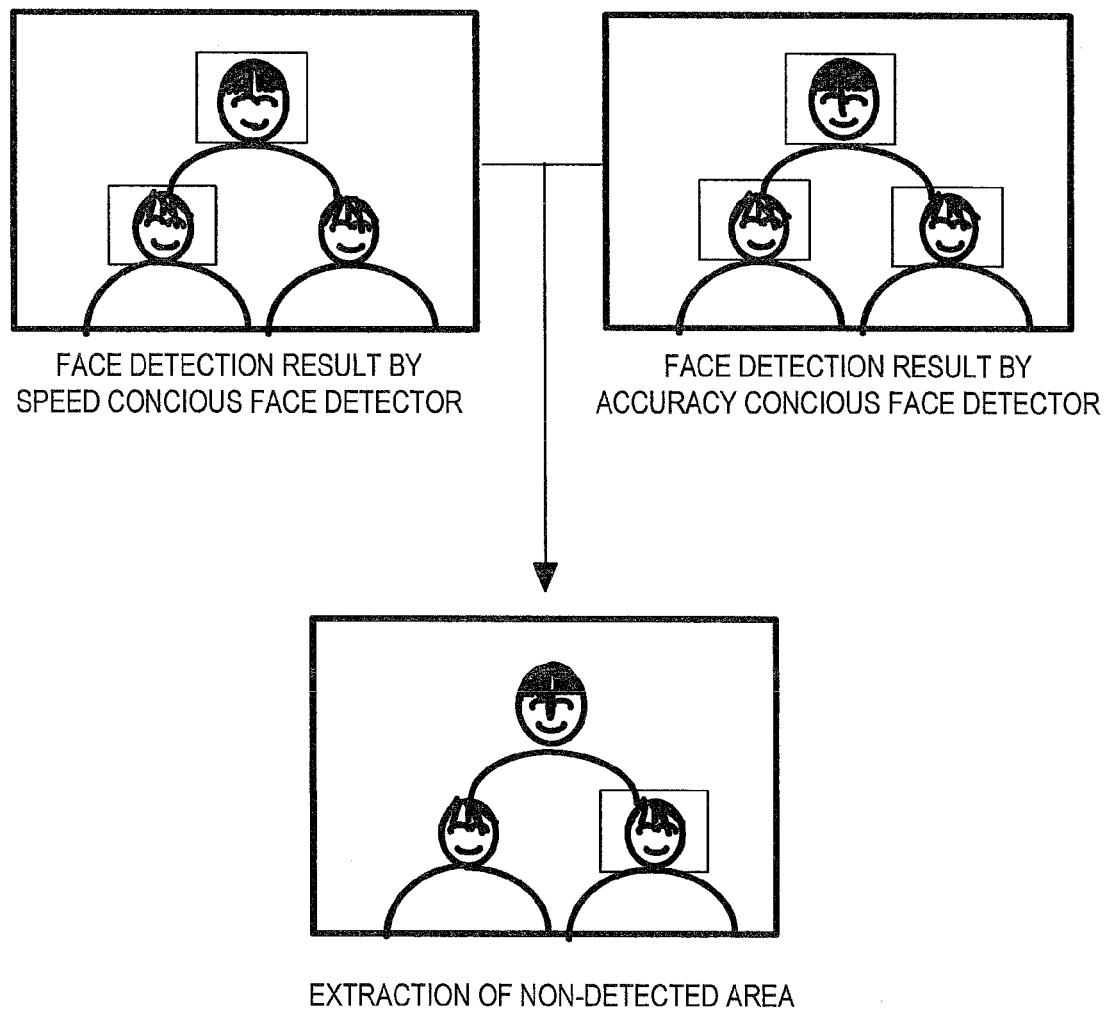
FIG. 13 depicts an example of face detection result with two face detectors.
Figure 14:
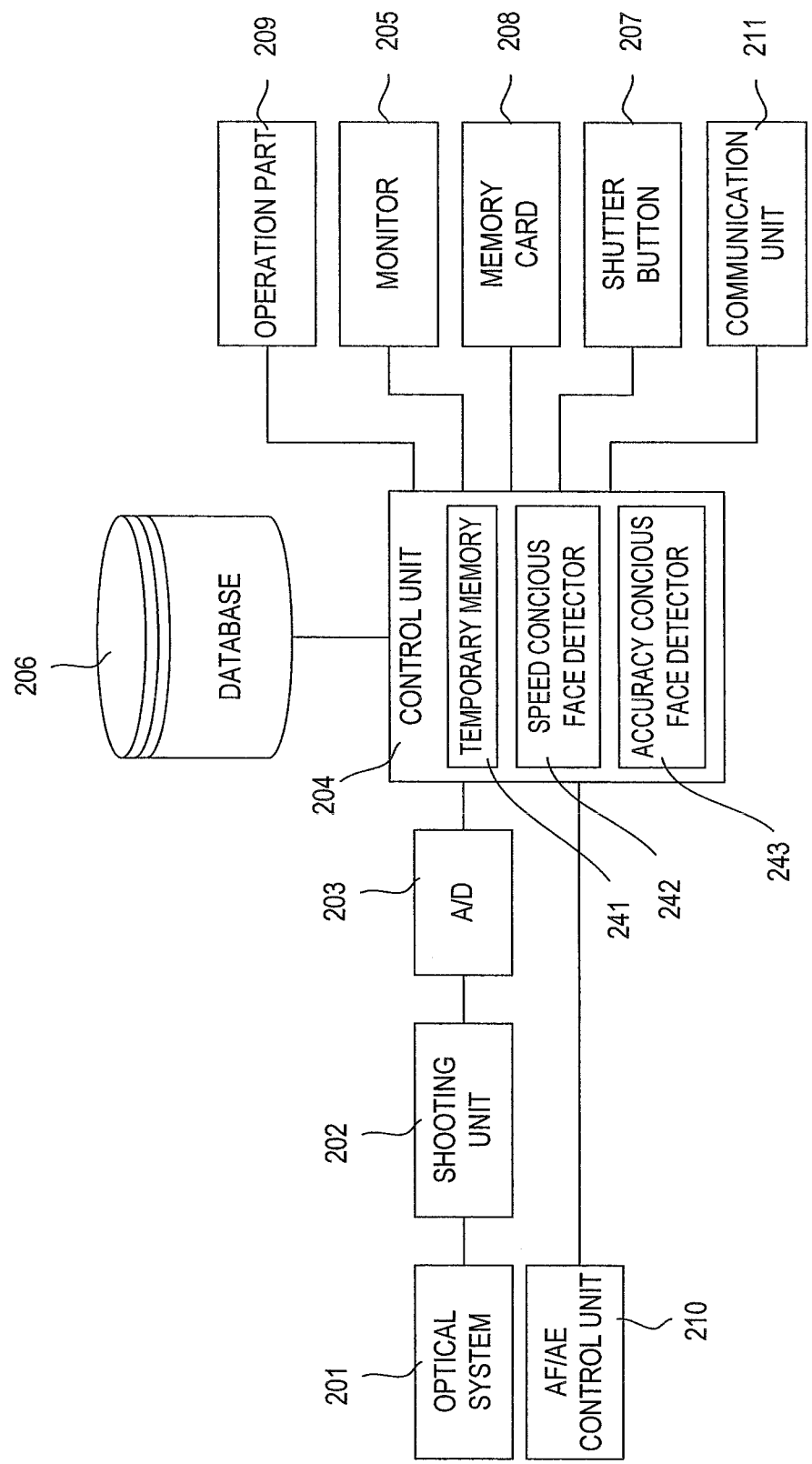
FIG. 14 depicts an example of a partial modification of the second embodiment.

At Step S49, the detection results of the two face detectors 242 and 243 are compared, and the area which is detected as a face area in the accuracy conscious face detector 243 but is not detected as a face area in the speed conscious face detector 242 is extracted as a non-detected area. FIG. 13 shows the situation at that time. In this example, among the faces of three people used as photographic subjects, the rectangular area surrounding the face of a person at the lower right in the screen is extracted as the non-detected area.

At Step S50, the image of the extracted non-detected area is associated with the value of the teacher signal, "1", which indicates that the image is a face image, and is stored in the database 206.

It is noted that if the image of a non-detected area is unconditionally stored in the database 206 as a face image, a non-face image will be stored in the database 206 as a face image in the case where the accuracy conscious face detector 243 mistakenly determines that an area not including a face is a face area, and therefore, it adversely affects the later learning result of the speed conscious face detector 242.

Therefore, at Step S50, it may determine whether the conviction value at the time when the extracted non-detected area is determined as a face in the accuracy conscious face detector 243 is greater than or equal to a predetermined value or not, to store the image of the extracted non-detected area in the database 206 if the conviction value is greater than or equal to the predetermined value.

Alternatively, the image of the extracted non-detected area may be displayed on the monitor 205, and after the user checks that a face is included in the image, the user may operate the control unit 204 to add the image of the extracted non-detected area into the database 206 as a face image. At this time, if a face is not included in the non-detected area, the image may be associated with the value of the teacher signal, "0", which indicates that the image is a non-face image, and may be added into the database 206 as a non-face image.

At Step S51, it determines whether the number of the added images has reached a predetermined number or not, and if it has reached the predetermined number, the learning of the speed conscious face detector 242 is executed. The reason why the learning is executed at the time when the number of the added images has reached a predetermined number is that it took into consideration the computation load caused by the learning.

The learning of the speed conscious face detector 242 is executed by remaking the discriminator $H_k$ which configures the speed conscious face detector 242 by executing again the process shown in FIG. 4 using the database 206 to which the image of the non-detected area is added. Since the learning is executed so that a non-detected area is detected as a face area, in the remade speed conscious face detector 242, the image of the non-detected area which is not yet detected as a face area is detected as a face area.

At Step S52, it determines whether to end the shooting or not, and if the shooting is to be ended, the process ends, and if not, the process returns to Step S41.

According to the above configuration, if a non-detected area is created at the speed conscious face detector 242, the learning of the speed conscious face detector 242 is executed so that the non-detected area is detected as a face area. The learning is executed based on a face of a person actually shot, and therefore, the detection accuracy for the face of a person frequently being a photographic subject improves as the learning progresses. Moreover, the learning of the speed conscious face detector 242 is executed while the user is oblivious to the learning, and therefore, it imposes few burdens to the user.

In the above embodiment, the speed conscious face detector 242 is applied to the through image and the accuracy conscious face detector 243 is applied to the shooting image. However, the configuration only needs to be applied the face detectors 242 and 243 to the same or substantially same image, and for example, the similar learning is possible even if the face detectors 242 and 243 are applied to the same shooting image.

The object which to expect improvement in the detection accuracy with the learning is not limited to a face of a specific person. For example, in the case where photographs of pets, such as a dog and a cat, are often shot, if the accuracy conscious face detector 243 can detect a face of a pet, the image of the face of the shot pet is added into the database 206 as a face image, and the learning of the speed conscious face detector 242 is executed, and therefore, it is also possible to improve the detection accuracy of a face of a pet by the speed conscious face detector 242.

Moreover, although the learning herein is executed by remaking the discriminator $H_k$ which configures the speed conscious face detector 242, the method of learning is not limited to this method. For example, the value of the threshold $\theta$ and the reliability value $\alpha$ of a weak discriminator which performed mistaken detection may be changed so that the area mistakenly determined to be a non-face area is correctly detected as a face area. According to this method, computation load can be lowered compared to the learning method which remakes the speed conscious face detector 242.

Alternatively, in the case where the discriminator $H_k$ is remade, it is possible to make modifications, such as imposing a different restriction from the weight of other image for the weight of the image in the area mistakenly determined to be a non-face area in spite of including a face. For example, with respect to the weight of the face image mistakenly determined to be a non-face area, even if it is determined correctly in the course of the learning, a restriction may be imposed so that the weight does not become smaller than a certain value, or a restriction may be imposed so that the weight always becomes larger than a certain value upon the update. Thereby, it is expected that the learning progresses so as to make correct determination to the image.

Moreover, since the load of the control unit 204 is heavy in the learning process, the learning may be executed in a situation such as during the user charging a battery of the digital camera. By executing the learning at the time when the user does not shoot, such as during the user charging the battery, it is possible to prevent the computation load from adversely affecting the shooting operations. It is noted that the computation for the learning may be done with a processor provided in a charger device of the digital camera or a cradle, instead of the control unit 204.

Moreover, instead of the method which Viola et al. propose, the face detector may be configured with other methods. In this case, the learning may be done by providing the image mistakenly determined to be a non-face image in spite of including a face to the face detector and by updating weight parameters of intermediate layers, etc., such that the determination value, "+1", which indicates a face is correctly outputted.

Moreover, as shown in FIG. 8, the accuracy conscious face detector 243 may be updated based on newest learning results by providing with a communication unit 211 which includes a communication device for connecting with a network external to the digital camera, such as a wireless LAN device and a Bluetooth device, retrieving the newest learning results from an external server through a network, such as the Internet.

If the detection accuracy of the accuracy conscious face detector 243 improves, the possibility that the face area which was not able to be detected by the speed conscious face detector 242 can be detected as a face area becomes higher and the learning of the speed conscious face detector 242 progresses further. Consequently, the accuracy of the detection by the speed conscious face detector 242 of the face of a person who frequently becomes a photographic subject can be further improved.

Furthermore, the non-detected area of the speed conscious face detector 242 may be configured to transmit to a service center through a network so that an operator in a service center determines the face area and the non-face area. The determined result is returned to the control unit 204 of the digital camera as a teacher signal through a network, and is added to the database 206 in a condition where the result is associated with the image of the non-detected area.

In accordance with this method, it is possible to prevent the image of the area which does not include a face being added into the database 206 as a face image and to prevent adversely affecting the learning of the speed conscious face detector 242 of the face detector, without increasing the operation burden of the user.

Figure 15:
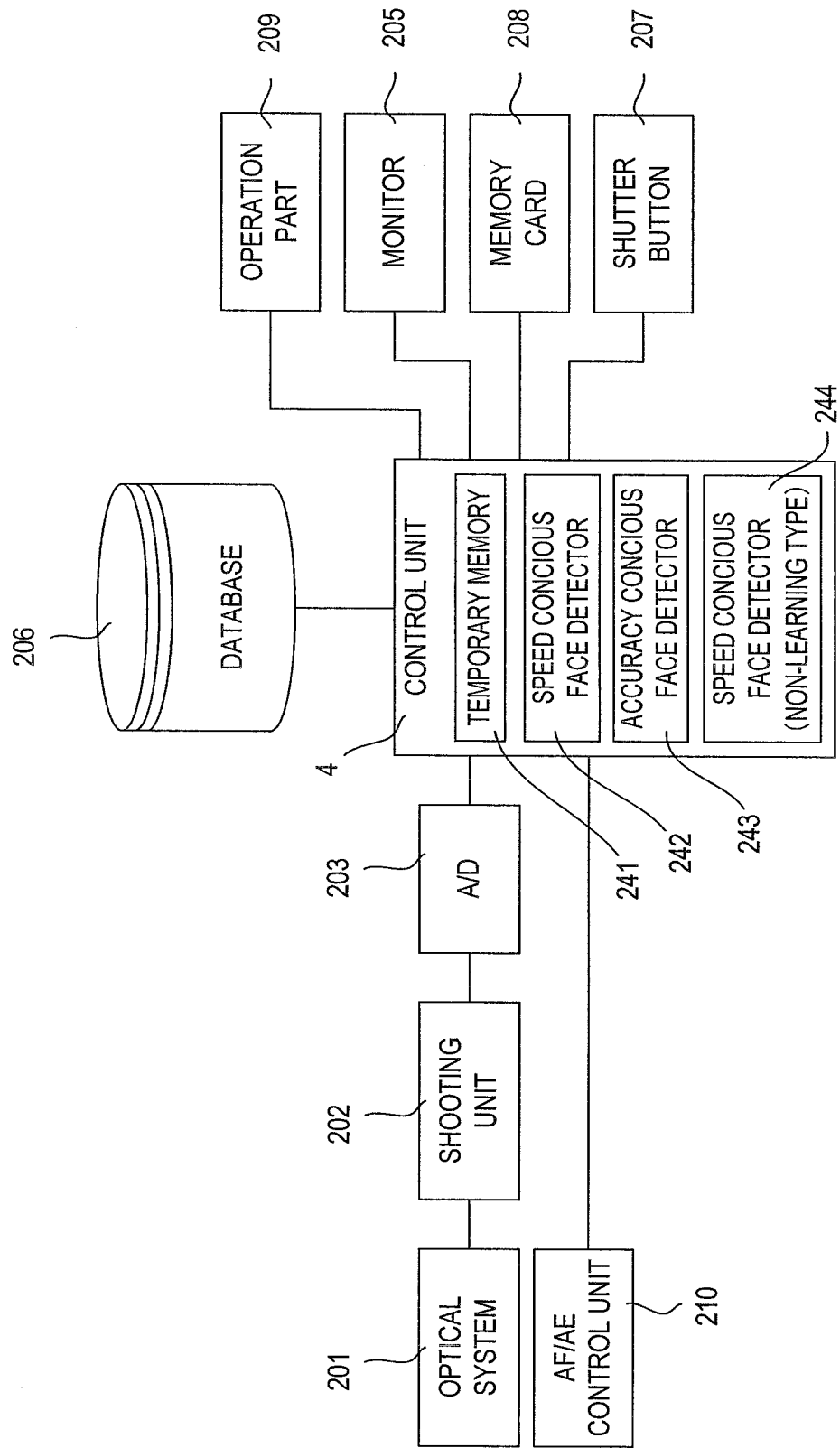
FIG. 15 depicts an example of a partial modification of the second embodiment.

Moreover, the detection accuracy of a face of a person who is not shot usually falls if the learning of the speed conscious face detector 242 progresses too much, and therefore, the face detection may not be performed correctly depending on shooting scenes. In order to avoid this, as shown in FIG. 15, the two speed conscious face detectors 242 and 244 are prepared, the learning is executed only to one speed conscious face detector 242, and the learning is not executed to the another speed conscious face detector 244 (third face detector). Then, the user is enabled to select either of the speed conscious face detector 242 underwent the learning or the speed conscious face detector 244 not underwent the learning according to a shooting scene by operating the operation part 209.

According to this arrangement, the face detection is done from the through image using the speed conscious face detector 244 not underwent the learning by selecting the speed conscious face detector 244 not underwent the learning. Therefore, even in a case where a person who is not shot usually is shot, it is possible to obtain detection accuracy better than a predetermined level.

Moreover, the digital camera may have a function which performs the maintenance of the image stored in the database 206. For example, in a case where the image stored in the database 206 is displayed in a thumbnail image to the monitor 205 with the teacher signal and the value of the teacher signal of the image which does not include a face is "1", which indicates a face image, by operating the operation part 209, the value of the teacher signal of the image may be rewritten to "0" (it may also be rewritten to the contrary), the user may be capable of deleting the image from the database 206. Thereby, it is possible to further improve the detection accuracy of the face of a person who is frequently used as a photographic subject.

Although the processes which the face detection device performs are premised on hardware processing, in the description of the above embodiment, it does not need to be limited to such a configuration. For example, a configuration which processes the process separately by software is also possible.

In this case, the face detection device includes a CPU, a main memory, such as a RAM, and a computer readable storage medium in which a program for realizing all or a part of the above process is stored. Here, this program is referred to as a face detection program. Similar process as the above face detection device is realized by the CPU reading the face detection program stored in the storage medium and executing processes for modifying and computing information.

Here, examples of the computer readable storage medium include a magnetic disk, a magneto-optical disc, a CD-ROM, a DVD-ROM, and a semiconductor memory. Moreover, the face detection program may be delivered to a computer via a communication line so that the computer which received the delivery executes the face detection program.

What is claimed is:

1. A face detection device, comprising:
a first face detector which detects face areas from a plurality of through images;
a second face detector which detects a face area from a shooting image, wherein a scene shot in the shooting image corresponds to the scene shot in one of the plurality of through images, and wherein the second face detector has higher detection accuracy than the first face detector; and
a control unit which extracts a non-detected area in the scene, wherein the non-detected area in the shooting image is detected as a face area in the second face detector but the non-detected area in the one of the plurality of through images is initially not detected as a face area in the first face detector, and wherein the control unit executes learning of the first face detector based on the non-detected area in the shooting image; and
wherein the non-detected area in the one of the plurality of through images is subsequently detected as a face area in the first face detector after the learning.

2. The face detection device according to claim 1, further comprising:
a database of the plurality of through images for learning which stores a plurality of face images, and wherein the control unit:
adds the one of the plurality of through images of the non-detected area into the database; and
executes learning of the first face detector using the database to which the one of the plurality of through images of the non-detected area is added.

3. The face detection device according to claim 2, wherein:
the control unit computes a conviction value which indicates a probability of a face being included in the non-detected area; and
if the conviction value is larger than a predetermined value, the control unit adds the one of the plurality of through images of the non-detected area into the database.

4. The face detection device according to claim 2, further comprising:
an operation part by which a user confirms whether a face is included in the non-detected area; and wherein:
the control unit adds the one of the plurality of through images of the non-detected area into the database if it is confirmed that a face is included in the non-detected area.

5. The face detection device according to claim 1, further comprising:
a third face detector which detects a face area from another one of the plurality of through images and is not a target of learning by the control unit; and an operation part which selects which of the first face detector or the third face detector to perform face detection.

6. A non-transitory computer readable storage device which stores a face detection program, the face detection program, when executing, performing:

detecting face areas from a plurality of through images by a first face detection process;

detecting by a second face detection process a face area from a shooting image, wherein a scene shot in the shooting image corresponds to the scene shot in one of the plurality of through images, and wherein the second face detection process has higher detection accuracy than the first face detection process;

extracting a non-detected area in the scene, wherein the non-detected area in the shooting image is detected as a face area in the second face detection process but the non-detected area in the one of the plurality of through images is initially not detected as a face area in the first face detection process; and executing learning of the first face detection process based on the non-detected area in the shooting image;

wherein the non-detected area in the one of the plurality of through images is subsequently detected as a face area in the first face detection process after the learning.

* * * * *